(12) United States Patent
Fujii et al.

(10) Patent No.: US 9,249,323 B2
(45) Date of Patent: Feb. 2, 2016

(54) INKJET INK, INK CARTRIDGE, INKJET RECORDING DEVICE, AND INK PRINTED MATTER

(71) Applicants: Hidetoshi Fujii, Shizuoka (JP); Hiroshi Gotou, Shizuoka (JP)

(72) Inventors: Hidetoshi Fujii, Shizuoka (JP); Hiroshi Gotou, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/327,817

(22) Filed: Jul. 10, 2014

(65) Prior Publication Data

US 2015/0030818 A1    Jan. 29, 2015

(30) Foreign Application Priority Data

Jul. 25, 2013   (JP) .................................. 2013-154341
May 23, 2014   (JP) .................................. 2014-107028

(51) Int. Cl.

| | |
|---|---|
| *B41M 5/00* | (2006.01) |
| *C09D 11/322* | (2014.01) |
| *B41M 5/50* | (2006.01) |
| *C09D 11/324* | (2014.01) |
| *C09D 11/36* | (2014.01) |
| *C09D 11/38* | (2014.01) |

(52) U.S. Cl.
CPC ............... *C09D 11/322* (2013.01); *B41M 5/50* (2013.01); *C09D 11/324* (2013.01); *C09D 11/36* (2013.01); *C09D 11/38* (2013.01)

(58) Field of Classification Search
CPC .... C09D 11/322; C09D 11/324; C09D 11/36; B41M 5/50
See application file for complete search history.

(56) References Cited

U.S. PATENT DOCUMENTS

| | | | |
|---|---|---|---|
| 2011/0216123 A1* | 9/2011 | Tamai et al. | ..................... 347/20 |
| 2012/0176455 A1* | 7/2012 | Ohta et al. | ..................... 347/102 |
| 2012/0227619 A1* | 9/2012 | Koganehira et al. | ........ 106/31.13 |

FOREIGN PATENT DOCUMENTS

| | | |
|---|---|---|
| JP | 2008-163238 | 7/2008 |
| JP | 2008-285605 | 11/2008 |
| JP | 2008-303380 | 12/2008 |
| JP | 2009-155662 | 7/2009 |
| JP | 2012-245721 | 12/2012 |

OTHER PUBLICATIONS

INKSYSTEMS—Printers at the best prices. 1999-2014.*

* cited by examiner

*Primary Examiner* — Bethelhem Shewareged
(74) *Attorney, Agent, or Firm* — Cooper & Dunam LLP

(57) ABSTRACT

Inkjet ink contains water, hydrosoluble organic materials; and a colorant, wherein the hydrosoluble organic materials account for 30% by weight to 50% by weight of the inkjet ink, wherein the hydrosoluble organic materials contain 3-methoxy-1-butanol, herein the hydrosoluble organic materials contain at least one of 1,3-butane diol, 3-methyl-1,3-butane diol, 1,2-butane diol, 2,3-butane diol, 1,2-pentane diol, 3-methyl-3-hydroxymethyl oxetane, 1,2-propane diol, or 1,3-propane diol in an amount of 1% of the inkjet ink.

7 Claims, 4 Drawing Sheets

INKJET INK, INK CARTRIDGE, INKJET RECORDING DEVICE, AND INK PRINTED MATTER

CROSS-REFERENCE TO RELATED APPLICATIONS

This patent application is based on and claims priority pursuant to 35 U.S.C. §119 to Japanese Patent Application Nos. 2013-154341 and 2014-107028, on Jul. 25, 2013 and May 23, 2014, respectively, in the Japan Patent Office, the entire disclosures of which are hereby incorporated by reference herein.

BACKGROUND

1. Technical Field

The present invention relates to inkjet ink, an ink cartridge, an ink jet recording device, and a recorded material.

2. Background Art

Inkjet recording methods are advantageous in comparison with other recording methods in that the process is simple, full colorization is easy, and quality images can be obtained by a simple structure.

Dye-based ink in which various hydrosoluble dyes are dissolved in water or a mixture of water and a hydrosoluble moisturizing agent is used as the ink for inkjet.

Although demand for high speed printing has been increasing in recent years, the transferability of aqueous ink after printing is a problem when it is used for plain paper.

Retransferability of ink is a phenomenon that if ink is attached to a recording medium to form an image and remains on the surface thereof in a large amount, the ink on the surface of the recording medium attaches to and contaminates a device such as a transfer roller when the printed surface of the image contacts the device while the recording medium is being transferred in the transfer path.

Various methods can be taken to subdue retransferability of ink. For example, it is possible to use ink that easily evaporates and dries or penetrates into a recording medium, improve the drying property and penetration drying property of a recording medium, or provide a drying device.

Aqueous pigment ink for inkjet recording has advantages such as less oozing on plaint paper, high image density, and no strike-through. However, if the evaporation drying properties of a pigment ink are improved, the pigment is condensed, thereby increasing the viscosity of the ink while an inkjet head is suspended in operation. As a result, intermittent discharging stability (discharging reliability after suspension of operation) is worsened.

JP-2008-303380-A and JP-2009-155662-A disclose ink containing 3-methoxy-3-methylbutanol. However, the retransferability of the ink is not mentioned therein.

SUMMARY

The present invention provides an improved inkjet ink containing water, hydrosoluble organic materials; and a colorant. The hydrosoluble organic materials account for 30% by weight to 50% by weight of the inkjet ink. The hydrosoluble organic materials contain 3-methoxy-1-butanol. The hydrosoluble organic materials contain at least one of 1,3-butane diol, 3-methyl-1,3-butane diol, 1,2-butane diol, 2,3-butane diol, 1,2-pentane diol, 3-methyl-3-hydroxymethyl oxetane, 1,2-propane diol, and 1,3-propane diol in an amount of 1% of the inkjet ink.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
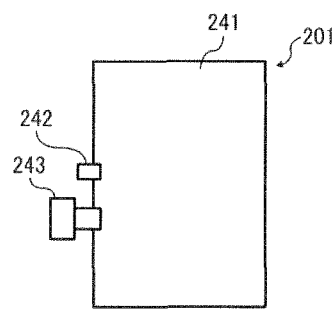
FIG. 1 is a schematic diagram of an example of an ink cartridge.

The present invention was made to provide inkjet ink that prevented the retransfer of the ink and had reliability and storage property (intermittent discharging stability) of inkjet heads after operation suspension.

As the result of an investigation, the present inventors have found that inkjet ink containing 3-methoxy-1-butanol is suitable to improve the retransferability and the intermittent discharging stability thereof.

The present invention is described in detail in the following 1. Since the following 2 to 6 are included in the embodiments of the present invention, these are also described.

1. Inkjet ink containing hydrosoluble organic materials; and a colorant, wherein the hydrosoluble organic materials account for 30% by weight to 50% by weight of the inkjet ink, wherein the hydrosoluble organic materials contain 3-methoxy-1-butanol, herein the hydrosoluble organic materials contain at least one of 1,3-butane diol, 3-methyl-1,3-butane diol. 1,2-butane diol, 2,3-butane diol, 1,2-pentane diol, 3-methyl-3-hydroxymethyl oxetane, 1,2-propane diol, or 1,3-propane diol in an amount of 1% of the inkjet ink.

2. The inkjet ink according to claim 1, wherein 3-methoxy-1-butanol accounts for from 15% by weight to 40% by weight of the inkjet ink.

3. The inkjet ink according to 1 or 2, wherein 1,3-butane diol, 3-methyl-1,3-butane diol, 1,2-butane diol, 2,3-butane diol, 1,2-pentane diol, 3-methyl-3-hydroxymethyl oxetane, 1,2-propane diol, and 1,3-propane diol account for 5% by weight to 40% by weight of the inkjet ink.

4. An ink cartridge including an ink container to accommodate any one of the inkjet ink of 1 to 3.

5. An inkjet recording device including the ink cartridge of 4.

6. An ink printed matter having a recording medium; and an image formed on the recording medium by any one of the inkjet ink of 1 to 4.

Inkjet Ink

The ink for inkjet of the present disclosure contains water, a hydrosoluble organic material, a colorant, and other optional components such as a defoaming agent and a water dispersible resin.

The hydrosoluble organic material is soluble in water and dissolved in ink at 15° C. to 35° C. Examples thereof are hydrosoluble moisturizing agents, hydrosoluble polymers, surfactants, permeating agents, corrosion inhibitors, anti-fungul agents. and dyes. The hydrosoluble organic material does not include organic pigments, inorganic pigments, resin compounds, etc. which are not dissolved but dispersed in the aqueous phase of ink.

The content of the hydrosoluble organic material ranges from 30% by weight to 50% by weight in terms of discharging stability and prevention of curling.

Moisturizing Agent

In the present disclosure, the moisturizing agent is a hydrosoluble organic material having a high moisture absorbency. When added to ink, the moisturizing ink remains in ink or on the surface of a recording medium, thereby subduing evaporation of moisture.

As a result of an investigation of such moisturizing agents, the present inventors have found that ink containing 3-methoxy-1-butanol is disadvantageous about storage property (intermittent discharging stability). However, as a result of a further investigation, the present inventors have found that ink that contains not only 3-methoxy-1-butanol but also at least one of 1,3-butane diol, 3-methyl-1,3-butane diol, 1,2-butane diol, 1,2-pentane diol, 2,3-butane diol, 3-methyl-3-hydroxymethyl oxetane, 1,2-propane diol, and 1,3-propane diol is excellent to prevent retransferability and improve storage property (intermittent discharging stability).

The content of 3-methoxy-1-butanol is preferably 10% by weight or more and more preferably from 15% by weight to 48% by weight of the entire ink. If the content is in the range of from 15% by weight to 40% by weight, the retransfer prevention and storage property (intermittent discharging stability) of ink are further improved, which is further more preferable.

The content of the compound group specified above used in combination with 3-methoxy-1-butanol is 1% by weight or more and preferably from 5% by weight to 40% by weight of the entire ink.

Other examples of the moisturizing agents are polyols, polyol alkyl ethers, polyol aryl ethers, nitrogen-containing heterocyclic compounds, amides, amines, sulfur-containing compounds, propylene carbonate, ethylene carbonate, and sugar. Specific examples thereof include, but are not limited to, 1,2,3-butane triol (boiling point: 175° C./33 hPa), 1,2,4-butane triol (boiling point: 190° C. to 191° C./24 hPa), glycerin (boiling point: 290° C.), dislycerin (boiling point: 270° C./20 hPa), triethylene glycol (boiling point: 285° C.), tetraethylene glycol (boiling point: 324° C. to 330° C.), diethylene glycol (boiling point: 245° C.), β-methoxy-N,N-dimethyl propion amide (boiling point: 216° C.), 2-pyrolidone (boiling point: 245° C.), and 1,3-dimethyl-25-imidazoline (boiling point: 225° C.).

In addition, the following is also suitable:
Isobutyl diglycol (bp: 220° C.), tripropylene glycol monomethyl ether (boiling point: 242° C.), 2-(2-isoropyl oxyethoxy) ethanol (boiling point: 207° C.), isopropyl glycol (boiling point: 142° C.), diethyl diglycol (boiling point: 189° C.), propyl propylene glycol (boiling point: 150° C.), tributyl citrate (boiling point: 234° C.), propyl propylene diglycol (boiling point: 220° C.), butyl propylene glycol (boiling point: 170° C.), butyl propylene diglycol (boiling point: 212° C.), methyl propylene glycol acetate (boiling point: 146° C.), triethylene glycol dimethyl ether (boiling point: 216° C.), N.N-dimethyl acrylamide (boiling point: 171° C.), N,N-diethyl acrylamide (boiling point: 56° C./3 mmHg), dipropylene glycol (boiling point: 232° C.), 1,5-pentane diol (boiling point: 242° C.), propylene glycol (boiling point: 187° C.), 2-methyl-2,4-pentane diol (boiling point: 197° C.), ethylene glycol (boiling point: 196° C.-198° C.), tripropylene glycol (boiling point: 267° C.), hexylene glycol (boiling point: 197° C.), polyethylene glycol (viscous liquid to solid), polypropylene glycol (boiling point: 187° C.), 1,6-hexane diol (boiling point: 253° C.-260° C.), and 1,2,6-hexane triol (boiling point: 178° C.).

Specific examples of the polyol alkyl ethers include, but are not limited to, ethylene glycol monoethyl ether (boiling point: 135° C.), ethylene glycol monobutyl ether (boiling point: 171° C.), diethylene glycol monomethyl ether (boiling point: 194° C.), diethylene glycol monoethyl ether (boiling point: 197° C.), diethylene glycol monobutyl ether (boiling point: 231° C.), ethylene glycol mono-2-ethylhexyl ether (boiling point: 229° C.), and propylene glycol monoethyl ether (boiling point: 132° C.).

Specific examples of the polyol aryl ethers include, but are not limited to, ethylene glycol monophenyl ether (boiling point: 237° C.) and ethylene glycol monobenzyl ether.

Specific examples of the nitrogen-containing heterocyclic compounds include, but are not limited to, N-methyl-2-pyrolidone (boiling point: 202° C.), 1,3-dimethyl-2-imidazolidinone (boiling point: 226° C.), ε-caprolactam (boiling point: 270 CC), and γ-butylolactone (boiling point: 204° C. to 205° C.).

Specific examples of the amides include, but are not limited to, formamide (boiling point: 210° C.), N-methyl formamide (boiling point: 199° C. to 201° C.), N,N-dimethylformamide (boiling point: 153° C.), and N,N-diethylformamide (boiling point: 176° C. to 177° C.).

Specific examples of the amines include, but are not limited to, monoethanol amine (boiling point: 170° C.), diethanol amine (boiling point: 268° C.), triethanol amine (boiling point: 360° C.), N,N-dimethyl monoethanol amine (boiling point: 139° C.), N-methyl diethanol amine (boiling point: 243° C.), N-methylethanol amine (boiling point: 159° C.), N-phenyl ethanol amine (boiling point: 282° C. to 287° C.), and 3-aminopropyl diethyl amine (boiling point: 169° C.).

Specific examples of the sulfur-containing compounds include, but are not limited to, dimethyl sulphoxide (boiling point: 139° C.), sulfolane (boiling point: 285° C.), and thiodiglycol (boiling point: 282° C.).

Sugar groups are also preferable as other solid aqueous organic solvents.

Specific examples of the sugar groups include, but are not limited to, monosaccharides, disaccharides, oligosaccharides (including triaccharides and tetrasaccharides), and polysaccharides. Specific examples thereof include, but are not limited to, glucose, mannose, fructose, ribose, xylose, arabinose, galactose, maltose, cellobiose, lactose, saccharose, trehalose, and maltotriose. Polysaccharides represent sugar in a broad sense and contain materials that are present widely in nature, for example, α-cyclodextrine and cellulose. In addition, specific examples of derivatives of these sugar groups include, but are not limited to, reducing sugars (for example, sugar alcohols (represented by $HOCH_2(CHOH)_nCH_2OH$, where n represents an integer of from 2 to 5) of the sugar groups specified above, oxidized sugars (e.g., aldonic acid and uronic acid), amino acid, and thio acid. Of these, sugar alcohols are preferable and specific examples thereof include, but are not limited to, maltitol and sorbit.

Coloring Agent (Colorant)

Dyes and pigments are used as the coloring agent (colorant).

Specific examples of the pigments include, but are not limited to, organic pigments such as azo-based pigment, phthalocyanine-based pigments, anthraquinone-based pigments, dioxadine-based pigments, indigo-based pigments, thioindigo-based pigments, perylene-based pigments, isoindolenone-based pigments, aniline black, azomethine-based pigments, and Rhodamine B lake pigments and inorganic pigments such as carbon black, iron oxide, titanium oxide, calcium oxide, barium oxide, aluminum hydroxide, barium yellow, ferric hexacyanoferrate, cadmium red, chromium yellow, and metal powder, Specific examples of black pigments include, but are not limited to, organic pigments such as carbon black (C.I. Pigment Black 7) such as furnace black, lamp black, and channel black, copper oxides, iron oxides (C.I. Pigment Black 11), metals such as titanium oxide, and aniline black (C.I. Pigment Black 1).

Specific examples of yellow pigments include, but are not limited to, C.I. Pigment Yellow 1 (fast yellow G), 2, 3, 12 (disazo yellow AAA), 13, 14, 16, 17, 20, 23, 24, 34, 35, 37, 42 (yellow iron oxides), 53, 55, 73, 74, 75, 81, 83 (disazo yellow HR), 86, 93, 95, 97, 98 100, 101, 104, 108, 109, 110, 114, 117, 120, 125, 128, 129, 137, 138, 139, 147, 148, 150, 151, 153, 154, 155, 166, 168, 180, and 185.

Specific examples of magenta pigments include, but are not limited to, C.I. Pigment Violet 19, C.I. Pigment Red 1, 2, 3, 5, 7, 9, 12, 17, and 22 (brilliant fast scarlet), 23, 31, 38, 48:1 [permanent red 2B (Ba)], 48:2 [Permanent Red 2B (Ca)], 48:3 [Permanent Red 2B (Sr)], 48:4 [Permanent Red 2B (Mn)], 49:1, 52:2, 53:1, 57:1 (Brilliant Carmine 6B), 60:1, 63:1, 63:2, 64:1, 81 (Rhodamine 6G Lake), 83, 88, 92, 97, 101 (rouge), 104, 105, 106, 108 (cadmium red), 112, 114, 122 (dimethylquinacridone), 123, 146, 149, 166, 168, 170, 172, 176, 178, 179, 180, 184, 185, 190, 192, 193, 202, 209, 215, 216, 217, 219, 220, 223, 226, 227, 228, 238, 240, 254, 255, and 272.

Specific examples of cyan pigments include, but are not limited to, C.I. Pigment Blue 1, 2, 3, 15 (copper phthalocyanine blue R), 15:1, 15:2, 15:3 (copper phthalocyanine blue G), 15:4, 15:6 (phthalocyanine blue E), 16, 17:1, 22, 56, 60, 63, and 64, Pat blue 4, and Pat blue 60.

Specific examples of intermediate color pigments include, but are not limited to, C.I. Pigment Red 177, 194, and 224, C.I. Pigment Orange 16, 36, 43, 51, 55, 59, 61, and 71, C.I. Pigment Violet 3, 19, 23, 29, 30, 37, 40, and 50, and C.I. Pigment Green 7 and 38 for red, green, and blue.

Of these pigments, as black pigments, carbon black is particularly preferable. It is suitable to use carbon black manufactured by a furnace method or channel method, which has a primary particle diameter of from 15 to 40 nm, a specific surface area of from 50 m2/g to 300 m2/g according to BET absorption method, a DPB absorption oil amount of from 40 mL/100 g to 150 mL/100 g, a volatile content of from 0.5% by weight to 10% by weight, and pH of from 2 to 9. Acid carbon black having a pH of 6 or less is particularly preferable because it has a high concentration.

As the color pigments, Pigment Yellow 13, 17, 55, 74, 93, 97, 98, 110, 128, 139, 147, 150, 151, 154, 155, 180, and 185, Pigment Red 122, 202, and 209, Pigment Violet 19, Pigment Blue 15:3 and 15:4 are particularly preferable.

There is no specific limit to the volume average particle diameter of the pigment. It is preferably from 20 nm to 200 nm, more preferably from 30 nm to 150 nm, and furthermore preferably from 50 nm to 100 nm. The volume average particle diameter of pigment in the present disclosure is 50% volume average particle diameter (D50), which is obtained by: preparing a sample by dilution with pure water in such a manner that the concentration of pigment in the sample is 0.01% by weight; and measuring the sample at 23° C. by a Microtrac UPA-150 (manufactured by NIKKISO CO., LTD.) with a particle refraction of 1.51, a particle density of 1.4 g/cm$^3$ while using the parameter of pure water as the solvent parameter.

The concentration of the pigment in the ink is preferably from 2% by weight to 15% by weight, more preferably from 3% by weight to 12% by weight, and furthermore preferably from 4% by weight to 10% by weight.

There are various methods of dispersing a pigment in ink, for example, a method of making a self-dispersible pigment by introducing a hydrophilic group into the surface of a pigment, a method of dispersing a dispersing resin, a method of dispersing a pigment in ink by coating the surface of the pigment with a resin, and a method of using a surfactant to disperse a pigment in ink.

Specifically, self-dispersible pigments can be used in which a functional group such as sulfone group and carboxyl group is attached to the surface of a pigment (e.g., carbon), thereby being dispersible in water.

Also, it is possible to use a material in which a pigment is made dispersible in water by encapsulating the pigment in a microcapsule. These can be paraphrased as resin particles that contains pigment particles. In this case, pigments blended in ink are not necessarily encapsulated or adsorbed in resin particles. Dispersing pigments in ink is possible unless the effect of the present disclosure is impaired.

Non-ionic or anionic surface active agent-based dispersants are suitably selected depending on the kind of pigments or ink prescription to conduct dispersion using a surfactant.

The addition amount of surfactant is preferably from about 10% by weight to 50% by weight to pigment.

With regard to dye, of dyes classified into acidic dyes, direct dyes, basic dyes, reactive dyes, and food dyes in the color index, dyes having high water resistance and light resistance are used.

These dyes can be mixed for use and other coloring agents such as pigments can be also mixed. However, the other coloring agents are added within a suitable range.

Specific examples of the dyes include, but are not limited to the following (a) to (d):

(a) Acidic Dyes and Food Dyes

C.I. Acid Yellow 17, 23, 42, 44, 79, and 142

C.I. Acid Red 1, 8, 13, 14, 18, 26, 27, 35, 37, 42, 52, 82, 87, 89, 92, 97, 106, 111, 114, 115, 134. 186, 249, 254, and 289. •C.I. Acid Blue 9, 29, 45, 92, and 249

C.I. Acid Black 1, 2, 7, 24, 26, and 94. •C.I. Food Yellow 3 and 4

C.I. Food Red 7, 9, and 14. •C.I. Food Black 1 and 2.

(b) Direct Dye

C.I. Direct Yellow 1, 12, 24, 26, 33, 44, 50, 86, 120, 132, 142, and 144

C.I. Direct Red 1, 4, 13, 17, 20, 28, 31, 39, 80, 83, 89, 225, and 227

C.I. Direct Orange 26, 29, 62, and 102 C.I. Direct Blue 1, 2, 6, 15, 22, 25, 71, 76, 79, 86, 87, 90, 98, 163, 165, 199, and 202

C.I. Direct Black 19, 22, 32, 38, 51, 56, 71, 74, 75, 77, 154, 168, and 171.

(c) Basic Dye

C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, and 91

C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112

C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155

C.I. Basic Black 2 and 8

(d) Reactive Dye

C.I. Reactive Black 3, 4, 7, 11, 12 and 17

C.I. Reactive Yellow 1, 5, 11, 13, 14, 20, 21, 22, 25, 40, 47, 51, 55, 65, and 67

C.I. Reactive Red 1, 14, 17, 25, 26, 32, 37, 44, 46, 55, 60, 66, 74, 79, 96, and 97

C.I. Reactive Blue 1, 2, 7, 14, 15, 23, 32, 35, 38, 41, 63, 80, and 95

Resin Emulsion

It is preferable to add a resin emulsion mainly to improve the abrasion resistance of an image and the preservation stability of ink when a pigment is used as the coloring agent. To improve the abrasion resistance of an image, emulsions of acrylic resins, styrene-acrylic resins, acrylic silicone resins, and fluorine-containing reams are preferable. To improve the storage stability, emulsions of polyurethane resins, acrylic resins, styrene-acrylic resins are preferable. However, since resin emulsions that improve abrasion resistance and storage stability at the same time are rare, it is good to use two kinds of resin emulsions in combination. Resin emulsions available on the market are suitable.

Specific examples of the resin emulsions are as follows:

(1) Urethane Resin Emulsion

The urethane resin of the urethane resin emulsion is formed by polymerizing polyisocyanates with polyether polyols, polyester polyyols, polylactone polyols, polycarbonate polyols, etc. Specific examples of the polyisocyanates include, but are not limited to, aliphatic series diisocyanate compounds such as hexamethylene diisocyanate and 2,2,4-trimethyl hexamethylene diisocyanate; alicyclic diisocyanate compounds such as isophorone diisocyanate, hydrogenerated xylilene diisocyanate, 1,4-cyclohexane diisocyanate and 4,4'-dicyclohexyl methane diisocyanate; aromatic aliphatic diisocyanate compounds such as xylilene diisocyanates and tetramethyl xylilene diisocyanates; aromatic diisocyanate compounds such as toluylene diisocyanate and phenyl methane diisocyanate; and modified products of these diisocyanates (carbodiimides, uretdione, and uretonimine containing, modified products).

As the polyether polyols, specific examples thereof include, but are not limited to, polyethylene glycol, polypropylene glycol, polytetraethylene ether glycol, and polyhexamethylene ether glycol.

As the polyester polyols, specific examples thereof include, but are not limited to, polyethylene adipate, polybutylene adipate, polynethopentyl adipate, poly-3-methyl pentyl adipate, polyethylene/butylene adipate, and polyneopentyl/hexyl adipate.

As the polylactone polyols, specific examples thereof include, but are not limited to, polycaprolacotone diols, and poly-omega-hydroxy caproic acid polyols.

As the polycarbonate polyols, specific examples thereof include, but are not limited to, known products obtained from reaction between diols such as 1,3-propane diol, 1,4-butane diol, 1,6-hexane diol, diethylene glycol, triethylene glycol, and tetraethylene glycol, phosgene, and diaryl carbonates such as diphenyl carbonate or cyclic carbonates such as ethylene carbonate and propylene carbonate.

(2) Acrylic Resin Emulsion

The acrylic resins of the acrylic resin emulsions can be prepared by polymerizing an acrylic resin monomer singly or co-polymerizing with other monomers.

As the acrylic resin monomers, specific examples thereof include, but are not limited to, methyl acrylate, ethyl acrylate, n-propyl acrylate, isopropyl acrylate, n-butyl acrylate, isobutyl acrylate, t-butyl acrylate, n-pentyl acrylate, isopentyl acrylate, neopentyl acrylate, 3-(methyl)butyl acrylate, 2-ethylhexyl acrylate, hexyl acrylate, cyclohexyl acrylate, octyl acrylate, nonyl acrylate, decyl acrylate, undecyl acrylate, dodecyl acrylate, phenyl acrylate, methyl methacrylate, n-propyl methacrylate, isopropyl methacrylate, n-butyl methacrylate, isobutyl methacrylate, t-butyl methacrylate, n-pentyl methacrylate, isopentyl methacrylate, neopentyl methacrylate, 3-(methyl)butyl methacrylate, 2-ethyl hexyl methacrylate, hexyl methacrylate, octyl methacrylate, nonyl methacrylate, decyl methacrylate, undecyl methacrylate, dodecyl methacrylate, acrylic acid, methacylic acid, acrylamide, methacrylamide, acrylonitrile, and methacrylonitrile.

As the other monomers, specific examples thereof include, but are not limited to, vinvyl-based aromatic hydrocarbons such as styrene, o-methyl styrene, m-methyl styrene, p-methyl styrene, α-methyl styrene, p-ethylstyrene, 2,4-dimethylstyrene, p-tert-butylstyrene, p-chlorostyrene, and divinyl benzene; unsaturated carboxylic acid such as itaconic acid and maleic acid; N-substituted maleimide, maleic anhydride, vinyl ketone, vinyl aetate, and vinylidene chloride.

The resin emulsion specified above demonstrates excellent water-dispersibility all the more by introducing an ionic group into the resin. Specific examples of such inoic groups include, but are not limited to, a sulfphonic group, a carboxylic group, a sulfate group, a phosphoric group, a phosphonic group, and phosphine group, and alkali metal basic groups, alkali earth metal basic groups, ammonium basic groups, and primary to tertiary amine groups thereof. Of these, a carboxylic alkali metal basic group, a carboxylic ammonium group, a sulphonic alkali metal basic group, and a sulphonic ammonium basic group are preferable and in particular, a sulphonic alkali metal basic group and a sulphonic ammonium basic group are preferable in terms of the aqueous dispersion stability. The ionic group is introduced by adding a monomer having an ionic group when synthesizing a resin. Li, K, or Na salts are preferable as salts.

Surface Active Agent (Surfactant)

The ink of the present disclosure optionally contains a surfactant.

As the surface active agent, it is preferable to use a surface active agent that has a low surface tension, a high permeability, and a excellent leveling property without degrading the dispersion stability irrespective of the kind of the coloring agent and the combinational use with the wetting agent. At least a surface active agent selected from the group consisting of anionic surface active agents, nonionic surface active agents, silicone-containing surface active agents, and fluorine-containing surface active agents is preferable. Of these, silicone-containing surface active agents and fluorine-containing surface active agents are particularly preferable.

These surfactants may be used alone or in combination.

A fluorine-based surface active agent in which the number of carbon atoms replaced with fluorine atoms is from 2 to 16 is preferable and, 4 to 16, more preferable. If the number of carbon atoms replaced with fluorine is from 2 to 16, the capability of decreasing surface tension is high and in addition, storage property is good.

Specific examples of the fluorine-containing surface active agents include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. Among these, polyoxyalkylene ether polymer compounds having a perfluoroalkyl ether group in its side chain are particularly preferable because of its low foaming property.

The fluorine-containing surface active agents represented by the following chemical formula are more preferable.

A symbol "m" represents 0 or an integer of from 1 to 10, and a symbol "n" represents an integer of from 1 to 40.

Specific examples of the perfluoroalkyl sulfonic acid compounds include, but are not limited to, perfluoroalkyl sulfonic acid and salts of perfluoroalkylsulfonic acid.

Specific examples of the perfluoroalkyl carboxylic acid compounds include, but are not limited to, perfluoroalkyl carboxylic acid and salts of perfluoroalkyl carboxylic acid.

Examples of the perfluoroalkyl phosphoric ester compounds include perfluoroalkyl phosphoric esters and perfluoroalkyl phosphoric ester salts.

Specific examples of the polyoxyalkylene ether polymer compounds having a perfluoroalkyl ether group in its side chain include, but are not limited to, polyoxyalkylene ether polymers having a perfluoroalkyl ether group in its side chain, sulfuric acid ester salts of polyoxyalkylene ether polymer having a perfluoroalkyl ether group in its side chain, and salts of polyoxyalkylene ether polymers having a perfluoroalkyl ether group in its side chain.

Examples of counter ions of salts in such fluorine-based surfactants include Li, Na, K, $NH_4$, $NH_3CH_2CH_2OH$, $NH_2(CH_2CH_2OH)_2$, and $NH(CH_2CH_2OH)_3$.

Any suitably synthesized fluorine-containing surface active agents and products thereof available in the market are also usable.

Examples of commercially available products include SURFLON S-111, S-112, S-113, S-121, S-131, S-132, S-141, and S-145 (these are manufactured by Asahi Glass Co., Ltd.); Fluorad FC-93, FC-95, FC-98, FC-129, FC-135, FC-170C, FC-430, and FC-431 (these are manufactured by Sumitomo 3M Limited); MEGAFACE F-470, F-1405, and F-444 (these are manufactured by Dainippon Ink and Chemicals); Zonyl TBS, FSP, ESA, FSN-100, FSN, FSO-100, FSO, FS-300, and UR (these are manufactured by E. I. du Pont de Nemours and Company); FT-110, FT-250, FT-251, FT-400S, FT-150, and FT-400SW (these are manufactured by NEOS COMPANY LIMITED), and PolyFox PF-151N, (these are manufactured by OMNOVA Solutions Inc.).

Of these, in particular, preferred are FS-300 (manufactured by E. I. du Pont de Nemours and Company), FT-110, FT-250, FT-251, FT-400S, FT-150, and FT-400SW (manufactured by NEOS COMPANY LIMITED), and PolyFox PF-151N (manufactured by OMNOVA Solutions Inc.) because good printing quality is achieved and, in particular, color development and level dyeing capability for paper sheets are considerably enhanced.

Preferred specific examples of the fluorine-containing surfactants include, but are not limited to, anionic fluorine-containing surfactants and nonionic fluorine-containing surfactants represented by the following chemical formulae. Any suitably synthesized surfactants and any product available on the market are suitably usable. Commercially available products easily obtained by Byc Chemie Japan Co., Ltd., Shin-Etsu Silicone Co., Ltd., Dow Corning Toray Co., Ltd., etc.

(1) Anionic Fluorine-Containing Surface Active Agent

Chemical formula 1

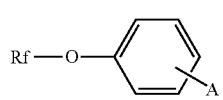

In the chemical formula 1 illustrated above, Rf represents a mixture of a fluorine-containing hydrophobic group represented by the following chemical formula 2.

A symbol "A" represents $-SO_3X$, $-COOX$, or $-PO_3X$, where X represents a counter cation. Specific examples of X include, but are not limited to, Li, Na, K, $NH_4$, $NH_3CH_2CH_2OH$, $NH_2(CH_2CH_2OH)_2$, and $NH(CH_2CH_2OH)_3$.

Chemical formula 2

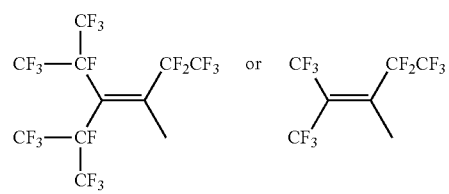

Chemical formula 3

In the chemical formula 3 illustrated above, a symbol "Rf" represents a fluorine-containing group represented by the following chemical formula 4. A symbol "X" represents the same as that in Chemical formula 1. A symbol "n" is 1 or 2 and a symbol "m" is 2−n.

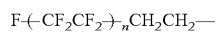  Chemical formula 4

In chemical formula 4, a symbol "n" represents an integer of from 3 to 10.

  Chemical formula 5

In the chemical formula 5 illustrated above, symbols "Rf" and "X" represent the same as those in chemical formula 3.

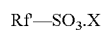  Chemical formula 6

In the chemical formula 6 illustrated above, symbols "Rf" and "X" represent the same as those in chemical formula 3.

(2) Nonionic Fluorine-Containing Surface Active Agent

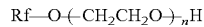  Chemical formula 7

In the chemical formula 7 illustrated above, a symbol "Rf" represents the same as that in chemical formula 1. A symbol "n" represents an integer of from 5 to 20.

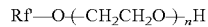  Chemical formula 8

In the chemical formula 8 illustrated above, a symbol "Rf" represents the same as that in chemical formula 3. A symbol "n" represents an integer of from 1 to 40.

There is no specific limit to the polyether-modified silicon-containing surface active agent. For example, a compound in which the polyalkylene oxide structure represented by the following chemical formula 9 is introduced into the side chain of the Si portion of dimethyl polysilooxane.

Chemical formula 9

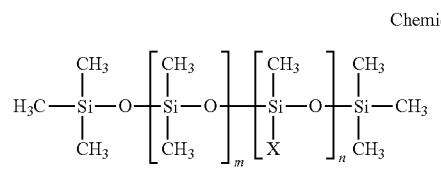

In the Chemical formula 9, "m", "n", "a" and "b" each, represent 0 or integers, respectively. R and R' each, represent alkyl groups or alkylene groups, respectively.

Specific examples of the polyether-modified silicone-containing surface active agents include, but are not limited to, KF-618, KF-642, and KF-643 (manufactured by Shin-Etsu Chemical Co., Ltd.)

Specific examples of the anionic surface active agents include, but are not limited to, polyoxyethylene alkyl ether acetates, dodecyl benzene sulfonates, laurates, and polyoxyethylene alkyl ether sulfates.

Specific examples of the nonionic surfactants include, but are not limited to, polyoxyethylene alkyl ethers, polyoxypropylene alkyl ethers, polyoxyethylene alkyl esters, polyoxyethylene sorbitan fatty acid esters, polyoxyethylene alkyl phenyl ethers, polyoxyethylene alkyl amines, and polyoxyethylene alkyl amides.

The content of the surfactant in ink is preferably from 0.01% by weight to 3.0% by weight and more preferably from 0.5% by weight to 2% by weight.

Penetrating Agent

The ink of the present disclosure optionally contains a penetrating agent. By adding a penetrating agent in ink in an amount of from 0.1% by weight to 4.0% by weight, the penetrating property of the ink to a recording medium is improved, thereby reducing voids between dots.

As the penetrating agent, it is preferable to contain at least one kind of polyol compounds having 8 to 11 carbon atoms or a glycol ether. Of these, penetrating agents having a solubility of from 0.2% by weight to 5.0% by weight in water at 25° C. are preferable. 2-ethyl-1,3-hexane diol {solubility: 4.2% (25° C.)} and 2,24-trimethyl-1,3-pentane diol {solubility: 2.0% (25° C.)} are particularly preferable.

Specific examples of the other polyol compounds include, but are not limited to, aliphatic diols such as 2-ethyl-2-methyl-1,3-propanediol, 3,3-dimethyl-1,2-butane diol, 2,2-diethyl-1,3-propane diol, 2-methyl-2-propyl-1,3-propane diol, 2,4-dimethyl-2,4-pentane diol, 2,5-dimethyl-2,5-hexane diol, and 5-hexene-1,2-diol.

Any other permeating agents that can be dissolved in ink and adjusted to have desired characteristics can be used in combination. Specific examples thereof include, but are not limited to, alkyl and aryl ethers of polyols such as diethylene glycol monophenylether, ethylene glycol monophenylether, ethylene glycol monoaryl ether, diethylene glycol monophenyl ether, diethylene glycol monobutyl ether, propylene glycol monobutyl ether, and tetraethylene glycol chlorophenyl ether and lower alcohols such as ethanol.

Other Additives

In addition to the specified above, known additives such as pH adjustment agents, antisepsis and anti-fungal agents, anti-corrosion agents, chelate reagents can be added to the ink of the present disclosure.

A pH controlling agent is added to stabilize the dispersion state and discharging by maintaining the ink in the stale of alkali. However, when the pH is 11 or greater, the head of inkjet and an ink supplying unit tends to be dissolved easily, which results in modification, leakage, bad discharging performance of the ink, etc. over an extended period of use depending on the material forming the head or the unit. When a pigment is used, it is more desirable to add a pH controlling agent when the pigment is mixed and kneaded and dispersed together with a dispersant in water than when additives such as a moisturizing agent and a penetrating agent are added after mixing, kneading, and dispersing. This is because such dispersion is broken depending on the kind of a pH control agent added.

The pH controlling agent is preferable to contain at least one of an alcohol amine, an alkali metal hydroxide, ammonium hydroxide, a phosphonium hydroxide, and an alkali metal carbonate.

Specific examples of such alcohol amines include, but are not limited to, diethanol amine, triethanol amine, and 2-amino-2ethyl-1,3-propane diol. Specific examples of such alkali metal hydroxides include, but are not limited to, lithium hydroxide, sodium hydroxide, and potassium hydroxide. Specific examples of such ammonium hydroxides include, but are not limited to, ammonium hydroxide and quaternary ammonium hydroxide. Specific examples of such alkali metal carbonates include, but are not limited to, lithium carbonate, sodium carbonate, and potassium carbonate.

Specific examples of the anti-septic and anti-fungal agents include, but are not limited, dehydrosodium acetate, sodium sorbinate, 2-pyridine thiol-1-oxide sodium, sodium benzoate, and pentachlorophenol sodium.

Specific examples of the anti-corrosion agents include, but are not limited to, acid sulfite, thiosodium sulfate, ammonium thiodiglycolate, diisopropyl ammonium nitrite, pentaerythritol tetranitrate, and dicyclohexyl ammonium nitrite.

Specific examples of the chleate reagents include, but are not limited to, ethylene diamine sodium tetraacetate, nitrilo sodium triacetate, hydroxyethylethylene diamine sodium triacetate, diethylene triamine sodium quinternary acetate, and uramil sodium diacetate.

The ink of the present disclosure is manufactured by dispersing or dissolving a colorant, a moisturizing agent, a surfactant, water, and other optional components such as a penetrating agent and a hydrodispersible resin in an aqueous medium, followed by stirring and mixing, if desired. This dispersion can be conducted with, for example, a sand mill, a homogenizer, a ball mill, a paint shaker, or an ultrasonic dispersion apparatus. The stirring and mixing can be conducted with, for example, a stirrer having a normal impeller, a magnetic stirrer, or a high-speed dispersion device.

Properties of the ink of the present disclosure are not particularly limited and can be appropriately selected to a particular application. For example, viscosity and surface tension are preferably within the following ranges.

The viscosity of the aqueous ink at 25° C. is preferably 5 mPa·s to 15 mPa·s. When the ink viscosity is 5 mPa·S or greater, the printing density and the printing quality are improved. When the ink viscosity is 15 mPa·S or less, a suitable ink discharging property is secured.

The ink viscosity can be measured by a viscometer (RL-500, manufactured by TOKI SANGYO CO., LTD.) at 25° C.

The surface tension of the ink is preferably 35 mN/m or less and more preferably 32 mN/m or less at 25° C. When surface tension is 35 mN/m or less, the leveling of ink on a recording medium is improved.

There is no specific limitation to the colors of the ink of the present disclosure. For example, yellow, magenta, cyan, and black are suitable. When an inkset having at least two kinds of colors is used for recording, multiple color images can be produced. When an inkset having all the color combinations is used, full color images can be formed.

The ink of the present disclosure is used in any printer having an inkjet head such as a piezoelectric element type in which ink droplets are discharged by transforming a vibration plate forming the wall of the ink flowing path using a piezoelectric element as a pressure generating device to press the ink in the ink flowing path as described in JP-H2-51734-A; a thermal type in which bubbles are produced by heating ink in the ink flowing path with a heat element as described in JP-S61-59911-A; and an electrostatic type in which ink droplets are discharged by transforming a vibration plate that forms the wall surface of the ink flowing path by a force of electrostatic generated between the vibration plate and the electrode while the vibration plate and the electrode are provided facing each other as described in JP-H6-71882-A).

The ink of the present disclosure is suitably used in an image forming apparatus (such as printer) employing inkjet recording system. For example, this ink can be applied to a printer that accelerates fixing an image by heating a recording medium or ink at 50° C. to 200° C. in the middle of or before or after printing. Also, the ink can be particularly preferably applicable to the ink cartridge, the inkjet recording device, and the ink printed matter of the present disclosure.

As the recording medium, plain paper having no coated layer is suitable. In general, plain paper having a size of 10S or greater and an air permeability of 5S to 50S used as typical photocopying paper is preferable.

Ink Cartridge

The ink cartridge of the present disclosure has a container that accommodates the ink of the present disclosure and other optional members appropriately selected.

There is no specific limit to the container. Any form, any structure, any size, and any material can be suitably selected to a particular application. For example, a container having at least an ink bag formed of aluminum laminate film, a resin film, etc. can be suitably used.

Figure 2:
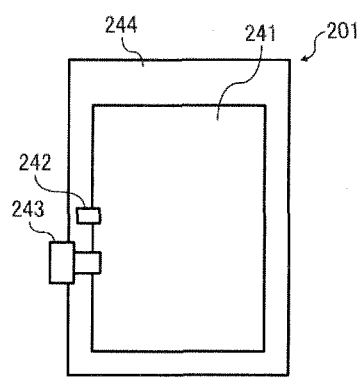
FIG. 2 is a schematic diagram illustrating a variation example of the ink cartridge illustrated in FIG. 1.

Next, the ink cartridge is described in detail with reference to FIGS. 1 and 2. FIG. 1 is a schematic diagram illustrating an example of the ink cartridge. FIG. 2 is a variation example of the ink cartridge illustrated in FIG. 1.

Figure 3:
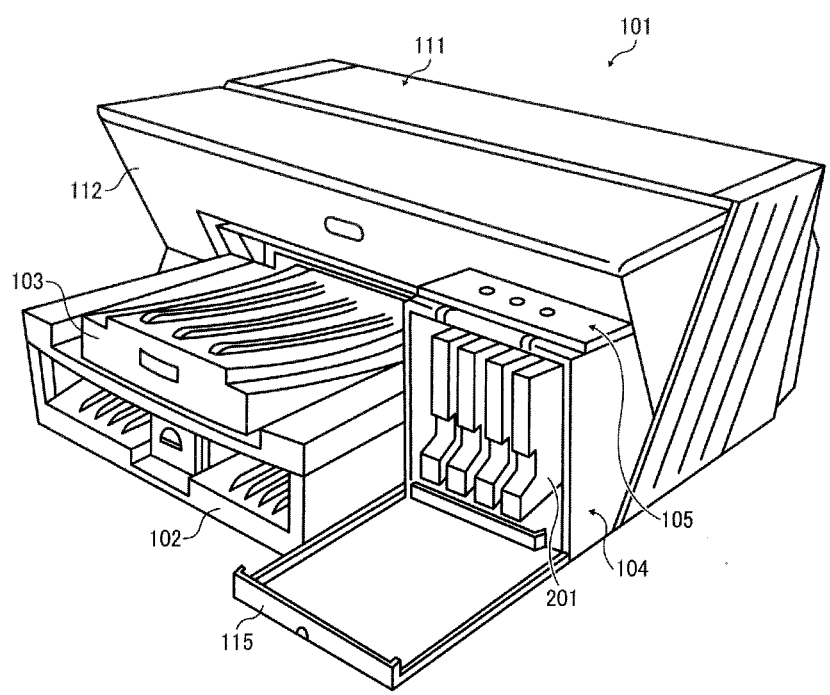
FIG. 3 is a perspective view illustrating an inkjet recording device in which the cover of an ink cartridge installation unit is open.

As illustrated in FIG. 1, after ink is supplied to an ink bag 241 through an ink inlet 242 and air remaining in the ink bag 241 is discharged, the ink inlet 242 is closed by fusion. When the ink is used, a needle provided to an inkjet recording device 101 illustrated in FIG. 3 is thrust in an ink outlet 243 made of rubber in order that that the ink is provided to the inkjet recording device 101. The ink bag 241 is made of a packaging material such as aluminum laminate film having no air permeability. The inkbag 241 is accommodated in a cartridge case 244 made of plastic as illustrated in FIG. 2 and detachably attachable to an inkjet recording device for use.

It is particularly preferable that the ink cartridge 201 is detachably attachable to various inkjet recording devices. Moreover, it is possible to make the inkjet recording device of the present disclosure by installing the ink cartridge of the present disclosure.

Inkjet Recording Method and Inkjet Recording Device

Inkjet recording methods include at least a step of forming an image on a recording medium by applying a stimulus to ink to discharge to the recording medium and optionally selected steps such as a stimulus generating step and a control process.

An inkjet recording method includes at least a step of forming an image on a recording medium by applying a stimulus to ink to discharge to the recording medium and optionally selected steps such as a stimulus generating step and a control process.

The inkjet recording method is executed by the inkjet recording device described above and the ink discharging step is suitably executed by the ink discharging device. In addition, the other steps are suitably executed by the other corresponding devices.

Moreover, to improve image quality with regard to image density, strike-through, oozing, etc., it is suitable to provide a step or device to apply a processing fluid before or after attaching ink to a recording medium.

Ink Discharging Step and Ink Discharging Step

The ink discharging step applies a stimulus (energy) to ink to discharge the ink to a recording medium to form an image on the recording medium.

The ink discharging device applies a stimulus (energy) to ink to discharge the ink to a recording medium to form an image on the recording medium. There is no specific limit to the ink discharging device. For example, nozzles for discharging ink can be suitably used.

In the present disclosure, it is preferable that at least part of a liquid room, a fluid resistance unit, a vibration plate, and a nozzle is formed of a material that contains silicon or nickel. In addition, the diameter of the nozzle of the inkjet nozzle is preferably 30 µm or less and more preferably from 1 µm to 20 µm.

The stimulus (energy) is generated by, for example, a stimulus generating device. There is no specific limit to the selection of the stimulus. Heat (temperature), pressure, vibration, and light can be suitably used. These may be used alone or in combination of two or more thereof. Of these, heat and pressure are preferable.

Specific examples of the stimulus generating device include, but are not limited to, a heater, a pressure device, a piezoelectric element, a vibrator, an ultrasonic oscillator, and light.

To be more specific, there are a piezoelectric actuator as the piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force.

There is no specific limit to how the ink is discharged, which differs depending on the kind of the stimulus. For example, in the case in which "heat" is applied as a stimulus, a method can be used which includes imparting thermal energy corresponding to recording signals to ink in an inkjet head by, for example, a thermal head to generate foams in the ink, thereby discharging and spraying the ink as droplets from the nozzles of the inkjet head due to the pressure of the foam. In addition, in a case in which "pressure" is applied as a stimulus, for example, a method can be used which includes applying a voltage to a piezoelectric element attached to the position of a pressure room located in the ink flow path in a recording head to bend the piezoelectric element, thereby decreasing the volume of the pressure room, so that the ink is discharged and sprayed from the nozzle holes of the recording head.

For example, it is preferable that the droplet size of the ink is from $3 \times 10^{-15}$ m$^3$ to $40 \times 10^{-15}$ m$^3$ (3 pL to 40 pL), the discharging and spraying speed is from 5 m/s to 20 m/s, the driving frequency is 1 kHz or more, and the resolution is 300 dpi or more.

If the controlling device described is be able to control the behavior of each device, there is no specific limit thereto and any controlling device can be suitably selected. For example, devices such as a sequencer and a computer can be used.

One embodiment of conducting inkjet recording using a serial type inkjet recording device is described with reference to accompanying drawings.

The inkjet recording device 101 illustrated in FIG. 3 has a feeder tray 102 to feed a recording medium to the inkjet recording device 101, a discharging tray 103 installed in the inkjet recording device 101 to store the recording media on which images are formed (recorded), and an ink cartridge inserting portion 104. On the upper surface of the ink cartridge inserting portion 104 is arranged an operating portion 105 such as operation keys and a display. The ink cartridge inserting portion 104 has a front cover 115 that opens and closes to detach and attach an ink cartridge 201. A reference numeral 111 represents an upper cover. Also, a reference numeral 112 represents a front surface of the inkjet recording device 101.

Figure 4:
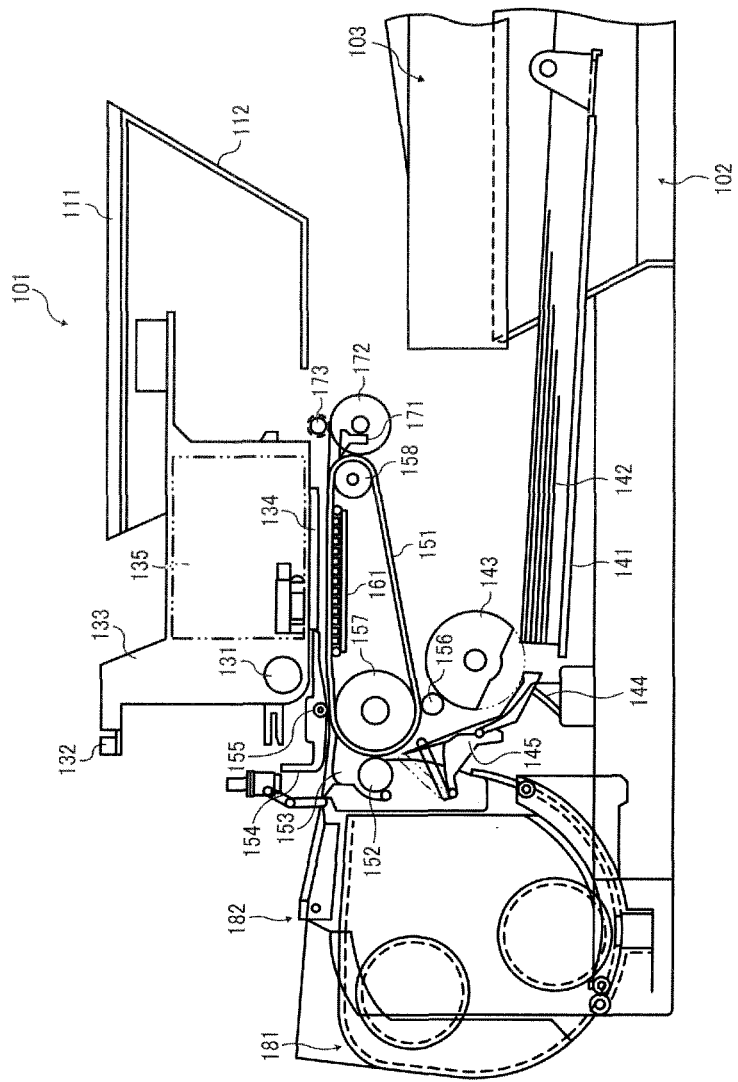
FIG. 4 is a cross section illustrating the entire configuration of the inkjet recording device of FIG. 3.
Figure 5:
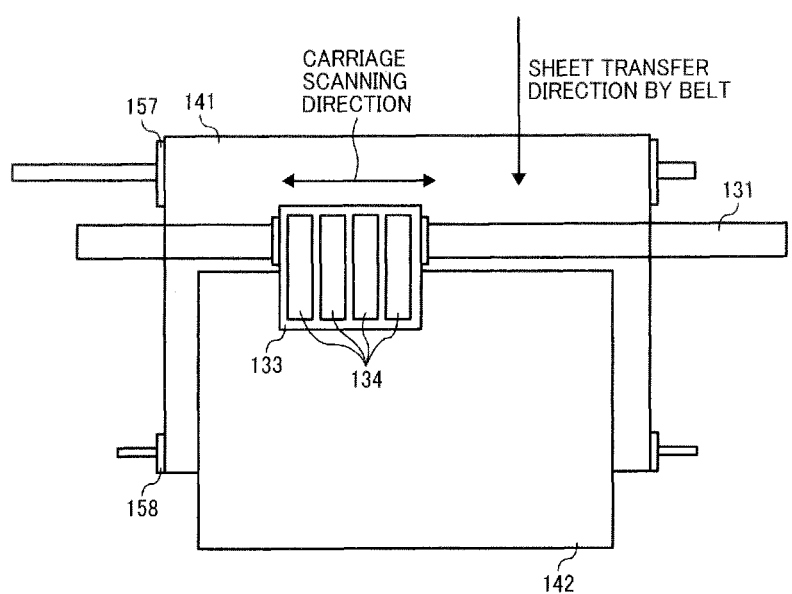
FIG. 5 is a schematic diagram illustrating an inkjet head of an inkjet recording device.

As illustrated in FIGS. 4 and 5, inside the inkjet recording device 101, a guide rod 131 serving as a guiding member that laterally bridges side plates on the right side and left side holds a carriage 133 slidably in the main scanning direction together with a stay 132. main scanning motor moves the carriage 133 in the direction indicated by the arrow in FIG. 5.

The carriage 133 has a recording head 134 having four inkjet recording heads that discharge ink droplets of each color of yellow (Y), cyan (C), magenta (Ni), and black (Bk) while multiple ink discharging mouths are arranged in the direction crossing the main scanning direction with the ink droplet discharging direction downward.

As the heads for inkjet heads that form the recording head 134, it is possible to use a device having an energy-generating device to discharge ink such as a piezoelectric actuator such as a piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force.

The carriage 133 has a sub tank 135 for each color to supply each color ink to the recording head 134. The ink is supplied and replenished to the sub-tanks 135 from the ink cartridge 201 mounted onto the ink cartridge loading unit 104 via an ink supplying tube.

A sheet feeding unit to feed a sheet 142 loaded on a sheet loader (pressure plate) 141 of the sheet feeder tray 102 includes a half-moon shape roller (sheet feeding roller 143) to separate and feed the sheet 142 one by one from the sheet loader 141 and a separation pad 144 that is made of a material having a large friction index and arranged facing the sheet feeding roller 143 while biased to the side of the sheet feeding roller 143.

A transfer unit to transfer the sheet 142 fed from the sheet feeding unit below the recording head 134 includes a transfer belt 151 to transfer the sheet 142 by electrostatic adsorption, a counter roller 152 to transfer the sheet 142 fed from the sheet feeding unit via a guide 145 by pinching the sheet 142 with a transfer belt 151, a transfer guide 153 to make the sheet 142 trace the transfer belt 151 by changing the transfer direction of the sheet 142 being sent substantially vertically upward substantially 90°, and a front end pressure roller 155 biased to the transfer belt 151 by a pressure member 154. In addition, a charging roller 156 serving as a charger is provided to charge the surface of the transfer belt 151.

The transfer belt 151 is an endless form belt, stretched between a transfer roller 157 and a tension roller 158 and rotatable in the belt transfer direction. This transfer belt 151 includes, for example, a top layer serving as a sheet adsorption surface having a thickness about 40 μm, made of a resin material such as a copolymer (ETFE) of tetrafluoroethylene and ethylene with no resistance treatment, and a bottom layer (moderate resistance layer, earth layer) made of the same material as the top layer with resistance treatment with carbon. On the rear side of the transfer belt 151, a guiding member 161 is arranged corresponding to the printing area by the recording head 134. A discharging unit to discharge the sheet 142 on which images are recorded by the recording head 134 includes a separation claw 171 to separate the sheet 142 from the transfer belt 151, a discharging roller 172, and a discharging roller 173. A discharging tray 103 is arranged below the discharging roller 172.

A duplex printing sheet feeding unit 181 is detachably attached to the rear side of the inkjet recording device 101. The duplex printing sheet feeding unit 181 takes in and reverses the sheet 142 that is returned by the reverse rotation of the transfer belt 151 and feeds it again between the counter roller 152 and the transfer belt 151. A manual sheet feeding unit 182 is provided on the upper surface of the duplex printing sheet feeding unit 181.

In this inkjet recording device, the paper 142 is separated and fed from the sheet feeding unit one by one substantially vertically upward, guided by the guide 145, and transferred while being pinched between the transfer belt 151 and the counter roller 152. Furthermore, the front end of the sheet 142 is guided by the transfer guide 153 and pressed against the transfer belt 151 by the front end pressure roller 155 to change the transfer direction by substantially 90°.

Since the transfer belt 157 is charged by the charging roller 156 at this point in time, the sheet 142 is electrostatically adsorbed to the transfer belt 151 and transferred. By driving the recording head 134 according to image signals while moving the carriage 133, ink droplets are discharged to the standstill paper 142 to record a single line of an image and thereafter the paper 142 is transferred in a predetermined amount to print the next line On receiving a signal indicating that recording is finished or the rear end of the sheet 142 has reached the image recording area, the recording operation stops and the sheet 142 is discharged to the discharging tray 103.

When the amount of ink remaining in the sub-tank 135 is detected as "almost empty", a predetermined amount of ink is replenished to the sub tank 135 from the ink cartridge 201.

In this inkjet recording device, it is possible to dissemble the chassis of the ink cartridge 201 and replace the ink bag therein when the ink is used up in the ink cartridge (201). In addition, the ink cartridge 201 stably supplies the ink even when the ink cartridge 201 is placed on its side and installed by front loading. Therefore, even when the inkjet recording device 101 is blocked upside, for example, it is accommodated in a rack or a thing is placed on the upper surface of the inkjet recording device 101, the ink cartridge 201 is easily exchanged.

A serial type (shuttle type) in which the carriage scans is used in this description but a line-type inkjet recording device having a line type head is also suitable.

The inkjet recording device of the present disclosure can be applied to recording systems employing inkjet recording system such as printers, facsimile machines, photocopiers, multi-functional machines (printer/facsimile/photocopier) for inkjet recording in particular.

Ink Printer Matter

The ink printed matter of the present disclosure is configured by images formed on a recording medium by using the ink of the present disclosure.

There is no specific limit to the selection of the recording medium. For examples, plain paper, gloss paper, special paper, cloth, film, and transparent sheets can be used. These may be used alone or in combination of two or more thereof.

The ink printed matter is of high quality image without blurring (oozing) and excellent in stability over time so that it can be suitably used for various purposes as references, etc., on which images, etc. are recorded.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present invention is described in detail with reference to Examples and Comparative Examples but not limited thereto.

Liquid dispersion of each pigment was prepared as follows.

Preparation Example 1

Liquid Dispersion of Surface Treated Carbon Black Pigment 90 g of carbon black having a CTAB specific surface area of 150 $m^2$/g and a DBP oil absorption amount of 100 mL/100 g was added to 3,000 mL of 2.5 N of sodium sulfate followed by stirring at 60° C. and at a stirring speed of 300 rpm to conduct reaction for 10 hours for oxidization treatment. The reaction liquid was filtrated and the thus-filtered carbon black was neutralized by sodium hydroxide solution followed by ultra-filtration. The thus-obtained carbon black was washed and dried and thereafter dispersed in deionized water in such a manner that the ratio of the carbon black was 30% by weight to obtain a liquid dispersion of surface-treated carbon black pigment.

Preparation Example 2

Liquid Dispersion of Surface Treated Yellow Pigment

C.I. Pigment Yellow 128 of yellow pigment was subject to low temperature plasma treatment to prepare a pigment into which a carboxylic acid group was introduced. The pigment was dispersed in deionized water followed by ultra-filtration membrane for salt-removing condensation to obtain a liquid dispersion of surface-treated yellow pigment having a pigment concentration of 30% by weight.

Preparation Example 3

Liquid Dispersion of Surface Treated Magenta Pigment

A liquid dispersion of magenta pigment was prepared in the same manner as in Preparation Example 2 except that C.I. Pigment Yellow 128 was changed to C.I. Pigment Red 122.

Preparation Example 4

Liquid Dispersion of Surface Treated Cyan Pigment

A liquid dispersion of cyan pigment was prepared in the same manner as in Preparation Example 2 except that C.I. Pigment Yellow 128 was changed to C.I. Pigment Blue 15:3.

Synthesis Example 1

Preparation of Polymer Solution

After sufficient replacement with nitrogen gas in a flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 4.0 g of styrene macromer (Product name: AS-6, manufactured by TOAGOSEI CO., LTD.), and 0.4 g of meracapto ethanol were placed therein and thereafter, the system was heated to 65° C. Next, a liquid mixture of 100.8 g of styrene, 25.2 g of acrylic acid, 108.0 g of lauryl methacylate, 36.0 g of polyethylene glycol methacrylate, 60.0 g of hydroxyethyl methacrylate, 36.0 g of styrene macromer (Product name: AS-6, manufactured by TOAGOSEI CO., LTD.), 3.6 g of meracapto ethanol, 2.4 g of azobis dimethyl valeronitril, and 18 g of methylethyl ketone was dripped to the flask in 2.5 hours. Subsequently, a liquid mixture of 0.8 g of azobis dimethyl valeronitrile and 18 g of methylethyl ketone was dripped to the flask in 0.5 hours. After aging at 65° C. for one hour, 0.8 g of azobis dimethyl valeronitrile was added followed by aging for another hour. After the reaction was complete, 364 g of methylethyl ketone was added into the flask to obtain 800 g of polymer solution having a concentration of 50% by weight.

Preparation Example 5

Preparation of Liquid Dispersion of Pigment Containing Polymer Particulate Containing Phthalocyanine Pigment 28 g of the polymer solution of Synthesis Example 1, 26 g of phthalocyanine pigment (CHROMOFINE BLUE A-220JC, manufactured by Dainichiseika Color & Chemicals Mfg. Co., Ltd.), 13.6 g of 1 mol/L of potassium hydroxide, 20 g of methylethyl ketone, and 30 g of deionized water were sufficiently stirred followed by mixing and kneading using a three roll mill. The thus-obtained paste was placed in 200 g of deionized water. Subsequent to sufficient stirring, methylethyl ketone and water were distilled away using an evaporator to obtain a liquid dispersion of cyan polymer particulate dispersion having a pigment concentration of 30% by weight.

Preparation Example 6

Preparation of Liquid Dispersion of Pigment Containing Polymer Particulate Containing Dimethylquinacridone Pigment A liquid dispersion of magenta polymer particulates was prepared in the same manner as in Preparation Example 5 except that the phthalocyanine pigment was replaced with Pigment Red 122.

Preparation Example 7

Preparation of Liquid Dispersion of Pigment Containing Polymer Particulate Containing MonoAzo Pigment A liquid dispersion of yellow polymer particulates was prepared in the same manner as in Preparation Example 5 except that the phthalocyanine pigment was replaced with Pigment Yellow 74.

Preparation Example 8

Preparation of Liquid Dispersion of Pigment Containing Polymer Particulate Containing Carbon Black A liquid dispersion of black polymer particulates was prepared in the same manner as in Preparation Example 5 except that the phthalocyanine pigment was replaced with carbon black (NIPEX 150, manufactured by Evonik Degussa Japan Co., Ltd.)

Examples 1 to 27 and Comparative Examples 1 to 19

Preparation of Inkjet Ink

A hydrosoluble organic solvent, a surfactant, and deionized water were mixed in ratios shown in Examples and Comparative Examples 1 to 4 and stirred for one hour for uniform mixing to obtain a liquid mixture. In addition, depending on the liquid mixture, a dispersion liquid of resin was added followed by one hour stirring and thereafter, a liquid dispersion of pigment was added followed by stirring. Thereafter, the resultant was adjusted by 10% by weight aqueous solution of lithium hydroxide in such a manner that pH was 9 followed by one hour stirring. This liquid dispersion was then filtered with a membrane filter having a pore size of 0.8 μm to obtain ink.

The values of each cell in Tables 1 to 4 are represented in parts by weight.

TABLE 1

|  |  | Example | | | | | | | | | | | |
|---|---|---|---|---|---|---|---|---|---|---|---|---|
|  |  | 1 | 2 | 3 | 4 | 5 | 6 | 7 | 8 | 9 | 10 | 11 | 12 |
| Liquid of dispersion of pigment (Solid portion of pigment) | Preparation Example 1 (Black) | 7 | 7 | 7 | 7 | 7 | 7 | 7 | 7 | | | | |
|  | Preparation Example 2 (Yellow) | | | | | | | | | 6 | | | |
|  | Preparation Example 3 (Magenta) | | | | | | | | | | 7 | | |
|  | Preparation Example 4 (Cyan) | | | | | | | | | | | 6 | |
|  | Preparation Example 6 (Magenta) | | | | | | | | | | | | 7 |
|  | Preparation Example 7 (Yellow) | | | | | | | | | | | | |
|  | Preparation Example 5 (Cyan) | | | | | | | | | | | | |
|  | Preparation Example 8 (Black) | | | | | | | | | | | | |
| Liquid dispersion of resin (Solid portion of pigment) | Acrylic-silicone resin emulsion | | | | 1 | | | | | | | | |
|  | Polyurethane resin emulsion | | | | | | | | 1 | | | | |
| Hydro-soluble organic material | 3-methoxy-1-butanol | 20 | 15 | 40 | 30 | 35 | 30 | 30 | 30 | 25 | 25 | 25 | 25 |
|  | 3-methoxy-3-methyl butanol | | | | | | | | | | | | |
|  | 1,3-butane diol | 20 | | 5 | | | | | | 15 | | | 15 |
|  | 3-methyl-1,3-butane diol | | | | 10 | | | | | | | | |
|  | 1,2-butane diol | | 20 | | | 5 | | | | | 15 | | |
|  | 1,2-pentane diol | | | | | | 10 | | | | | 15 | |
|  | 2,3-butane diol | | | | | | | 10 | | | | | |
|  | 3-methyl-3-hydroxy methyl oxetane | | | | | | | | 10 | | | | |
|  | 1,2-propane diol | | | | | | | | | | | | |
|  | 1,3-propane diol | | | | | | | | | | | | |
|  | Tri-ethylene | | | | | | | | | | | | |

TABLE 1-continued

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| | glycol monomethyl ether | | | | | | | | | | | | |
| | Triethylene glycol diethyl ether | | | | | | | | | | | | |
| | 1,5-pentane diol | | | | | | | | | | | | |
| | 1,4-butane diol | | | | | | | | | | | | |
| | Glycerine | | | | | | | | | | | | |
| Surfactant | DSN403N | 0.03 | 0.03 | 0.03 | 0.03 | 0.03 | 0.03 | 0.03 | | | 0.03 | 0.03 | 0.03 |
| | Softanol EP-7025 | | | | | | | | 0.50 | | | | |
| | NIKKOL ECTD-3NEX | | | | | | | | | 1.00 | | | |
| Deionized water | | B | B | B | B | B | B | B | B | B | B | B | B |
| Total | | 100 | 100 | 100 | 100 | 100 | 100 | 100 | 100 | 100 | 100 | 100 | 100 |
| Total amount of hydrosoluble organic material | | 40.03 | 35.03 | 45.03 | 40.03 | 40.03 | 40.03 | 40.03 | 40.50 | 41.00 | 40.03 | 40.03 | 40.03 |

B: Balance

TABLE 2

| | | Example | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| Liquid of dispersion of pigment (Solid portion of pigment) | Preparation Example 1 (Black) | | | | 7 | 7 | 7 | 7 | 7 | 7 | | | 7 |
| | Preparation Example 2 (Yellow) | | | | | | | | | | | 6 | |
| | Preparation Example 3 (Magenta) | | | | | | | | | | | | |
| | Preparation Example 4 (Cyan) | | | | | | | | | | | | |
| | Preparation Example 6 (Magenta) | | | | | | | | | | | | |
| | Preparation Example 7 (Yellow) | 6 | | | | | | | | | | | |
| | Preparation Example 5 (Cyan) | | 6 | | | | | | | | | | |
| | Preparation Example 8 (Black) | | | 7 | | | | | | | 7 | | |
| Liquid dispersion of resin (Solid portion of pigment) | Acrylic-silicone resin emulsion | | | | | | | | | | | | |
| | Polyurethane resin emulsion | | | | | | | | | | | | |
| Hydro-soluble organic material | 3-methoxy-1-butanol | 25 | 25 | 25 | 10 | 48 | 10 | 30 | 30 | 15 | 25 | 30 | 10 |
| | 3-methoxy-3-methyl butanol | | | | | | 20 | | | | | | |

TABLE 2-continued

| | | Example | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| | 1,3-butane diol | | | | 20 | 1 | | 1 | | 5 | | 3 | 20 |
| | 3-methyl-1,3-butane diol | | | | | | | | 2 | 5 | | | 19 |
| | 1,2-butane diol | 15 | | | | | 17 | | | 10 | | | |
| | 1,2-pentane diol | | 15 | | | | | | | | 10 | | |
| | 2,3-butane diol | | | 15 | | | | | | | 5 | | |
| | 3-methyl-3-hydroxy methyl oxetane | | | | | | | | | 5 | 3 | | |
| | 1,2-propane diol | | | | | | | | | | | | |
| | 1,3-propane diol | | | | | | | | | | | | |
| | Triethylene glycol monomethyl ether | | | | | | | | | | | | |
| | Triethylene glycol diethyl ether | | | | | | | | | | | | |
| | 1,5-pentane diol | | | | | | | | | | | | |
| | 1,4-butane diol | | | | | | | | | | | | |
| | Glycerine | | | | | | | | | | | | |
| Surfactant | DSN403N | 0.03 | 0.03 | | 0.03 | 0.03 | 0.03 | | 0.03 | 0.03 | 0.03 | 0.03 | 0.03 |
| | Softanol EP-7025 | | | 0.50 | | | | | | | | | |
| | NIKKOL ECTD-3NEX | | | | | | | 1.00 | | | | | |
| Deionized water | | B | B | B | B | B | B | B | B | B | B | B | B |
| Total | | 100 | 100 | 100 | 100 | 100 | 100 | 100 | 100 | 100 | 100 | 100 | 100 |
| Total amount of hydrosoluble organic material | | 40.03 | 40.03 | 40.05 | 30.03 | 49.03 | 47.03 | 32.00 | 32.03 | 35.03 | 45.03 | 36.03 | 49.03 |

B: Balance

TABLE 3

| | | Example | | | Comparative Example | | | | | | | | |
|---|---|---|---|---|---|---|---|---|---|---|---|---|---|
| | | 25 | 26 | 27 | 1 | 2 | 3 | 4 | 5 | 6 | 7 | 8 | 9 |
| Liquid of dispersion of pigment (Solid portion of pigment) | Preparation Example 1 (Black) | 7 | 7 | 7 | 7 | 7 | 7 | 7 | 7 | 7 | | 7 | 7 |
| | Preparation Example 2 (Yellow) | | | | | | | | | | | | |
| | Preparation Example 3 (Magenta) | | | | | | | | | | | | |
| | Preparation Example 4 (Cyan) | | | | | | | | | | | | |
| | Preparation Example 6 | | | | | | | | | | | | |

TABLE 3-continued

| | | Example | | | Comparative Example | | | | | | | | |
|---|---|---|---|---|---|---|---|---|---|---|---|---|---|
| | | 25 | 26 | 27 | 1 | 2 | 3 | 4 | 5 | 6 | 7 | 8 | 9 |
| Liquid dispersion of resin (Solid portion of pigment) | (Magenta) Preparation Example 7 | | | | | | | | | | | | |
| | (Yellow) Preparation Example 5 | | | | | | | | | | | | |
| | (Cyan) Preparation Example 8 | | | | | | | | | | 7 | | |
| | (Black) | | | | | | | | | | | | |
| | Acrylic-silicone resin emulsion | | | | | | | | | | | | |
| | Polyurethane resin emulsion | | | | | | | | | | | | |
| Hydro-soluble organic material | 3-methoxy-1-butanol | 8 | 35 | 30 | 40 | | 30 | 30 | 30 | 30 | 25 | 25 | |
| | 3-methoxy-3-methyl butanol | | | | | 20 | | | | | | | |
| | 1,3-butane diol | 20 | | | | 20 | | | | | | | 20 |
| | 3-methyl-1,3-butane diol | | | | | | | | | | | | |
| | 1,2-butane diol | | | | | | | | | | | | |
| | 1,2-pentane diol | | | | | | | | | | | | |
| | 2,3-butane diol | | | | | | | | | | | | |
| | 3-methyl-3-hydroxymethyl oxetane | | | | | | | | | | | | |
| | 1,2-propane diol | | 5 | | | | | | | | | | |
| | 1,3-propane diol | | | 10 | | | | | | | | | |
| | Triethylene glycol monomethyl ether | | | | | | 10 | | | | | | |
| | Triethylene glycol diethyl ether | 10 | | | | | | | 10 | | | | |
| | 1,5-pentane diol | | | | | | | | | 10 | | 15 | |
| | 1,4-butane diol | | | | | | | | | 10 | | | |
| | Glycerine | | | | | | | | | | 15 | | 10 |
| Surfactant | DSN403N | | 0.03 | 0.03 | | 0.03 | | | 0.03 | | | 0.03 | |
| | Softanol EP-7025 | | | | | | 0.50 | | | 0.50 | | | 0.50 |
| | NIKKOL ECTD-3NEX | 1.00 | | | 1.00 | | | 1.00 | | | 1.00 | | |
| | Deionized water | B | B | B | B | B | B | B | B | B | B | B | B |
| | Total | 100 | 100 | 100 | 100 | 100 | 100 | 100 | 100 | 100 | 100 | 100 | 100 |
| | Total amount of hydrosoluble organic material | 39.00 | 40.03 | 40.03 | 41.00 | 40.03 | 40.50 | 41.00 | 40.03 | 40.50 | 41.00 | 40.03 | 30.50 |

B: Balance

TABLE 4

| | | Comparative Example | | | | | | | | | |
|---|---|---|---|---|---|---|---|---|---|---|---|
| | | 10 | 11 | 12 | 13 | 14 | 15 | 16 | 17 | 18 | 19 |
| Liquid of dispersion of pigment (Solid portion of pigment) | Preparation Example 1 (Black) | 7 | | | | | | | 7 | | 7 |
| | Preparation Example 2 (Yellow) | | 6 | | | | | | | | |
| | Preparation Example 3 (Magenta) | | | 7 | | | | | | | |
| | Preparation Example 4 (Cyan) | | | | 6 | | | | | | |
| | Preparation Example 6 (Magenta) | | | | | 7 | | | | | |
| | Preparation Example 7 (Yellow) | | | | | | | 6 | | | |
| | Preparation Example 5 (Cyan) | | | | | | 6 | | | | |
| | Preparation Example 8 (Black) | | | | | | | | | 7 | |
| Liquid dispersion of resin (Solid portion of pigment) | Acrylic-silicone resin emulsion | | | | | | | | | | |
| | Polyurethane resin emulsion | | | | | | | | | | |
| Hydro-soluble organic material | 3-methoxy-1-butanol | 10 | | 30 | 30 | 30 | 30 | 25 | 50 | 55 | 10 |
| | 3-methoxy-3-methyl butanol | | 20 | | | | | | | | |
| | 1,3-butane diol | 20 | 20 | | | | | | 2 | | 15 |
| | 3-methyl-1,3-butane diol | 22 | | | | | | | | | |
| | 1,2-butane diol | | | | | | | | | 15 | |
| | 1,2-pentane diol | | | | | | | | | | |
| | 2,3-butane diol | | | | | | | | | | |
| | 3-methyl-3-hydroxy methyl oxetane | | | | | | | | | | |
| | 1,2-propane diol | | | | | | | | | | |
| | 1,3-propane diol | | | | | | | | | | |
| | Triethylene glycol monomethyl ether | | | 10 | | | | | | | |
| | Triethylene glycol diethyl ether | | | | 10 | | | | | | |
| | 1,5-pentane diol | | | | | 10 | | | | | |
| | 1,4-butane diol | | | | | | 10 | | | | |
| | Glycerine | | | | | | | 15 | | | |

TABLE 4-continued

|  |  | Comparative Example | | | | | | | | | |
|---|---|---|---|---|---|---|---|---|---|---|
|  |  | 10 | 11 | 12 | 13 | 14 | 15 | 16 | 17 | 18 | 19 |
| Surfactant | DSN403N | 0.03 | 0.03 |  |  | 0.03 |  |  |  |  | 0.03 |
|  | Softanol EP-7025 |  |  | 0.50 |  |  | 0.50 |  |  |  |  |
|  | NIKKOL ECTD-3NEX |  |  |  | 1.00 |  |  | 1.00 | 1.00 | 1.00 |  |
|  | Deionized water | B | B | B | B | B | B | B | B | B | B |
|  | Total | 100 | 100 | 100 | 100 | 100 | 100 | 100 | 100 | 100 | 100 |
|  | Total amount of hydrosoluble organic material | 52.03 | 40.03 | 40.50 | 41.00 | 40.03 | 40.50 | 41.00 | 53.00 | 71.00 | 25.03 |

B: Balance

Product names, etc. shown in Tables 1 to 4 are as follows:
Acrylic-silicone resin emulsion: (POLYSOL® ROY6312, a solid content of 40% by weight, an average particle diameter of 171 nm, a minimum film-forming temperature (MFT) =20° C., manufactured by SHOWA HIGH-POLYMER CO., LTD.)
Polyurethane resin emulsion: HYDRAN APX-101H, solid portion of 45% by weight, average particle diameter of 160 nm, a minimum film-forming temperature (MFT)=20° C., manufactured by DIC Corporation)
DSN403N: Fluorine-containing surfactant (effective component: 98% by weight or more, manufactured by DAIKIN INDUSTRIES, ltd.)
SOFTANOL EP-7025: polyoxyalkylene alkyl ether (component 100% by weight, manufactured by NIPPON SHOKUBAI CO., LTD.)
NIKKOL ETCD-3NEX: polyoxyethylene (3) tridecyl ether sodium acetate (effective component: 98% by weight, manufactured by Nikko Chemicals Co., Ltd.)

The properties of the ink of Examples and Comparative Examples were evaluated according to the following.

As the recording medium, quality paper (My Paper, weight: 69.6 g/m², size degree: 23.2 second, air permeability: 21 seconds, manufactured by NBS RICOH CO., LTD.) was used.

The results are summarized in Table 5.

Preparation of Evaluation on Printed Image

In an environment in which the temperature and moisture were adjusted to 23° C. and 50% RH, using an inkjet printer (IPSIO GXe 5500, manufactured by RICOH CO., LTD.) to discharge the same amount of ink, a setting was made such that the same amount of ink was attached to the recording media by changing the driving voltage of piezoelectric element in order that the discharging amount of the ink was even. A "solid square chart" of each color drawn by Microsoft Word 2000 was as follows.

Color Designation of "Square Solid Chart" of Microsoft Word
RGB color model
Black: Red (R) 0, Green (G) 0, Blue (B) 0
Yellow: Red (R) 255, Green (G) 255, Blue (B) 0
Magenta: Red (R) 255, Green (G) 0, Blue (B) 255
Cyan: Red (R) 0, Green (G) 0, Blue (B) 255
Image Density A "square solid chart" having 64 point texts prepared by Microsoft Word 2000 was output on the recording medium and thereafter the color of the "square solid chart" portion of the printed surface was measured by X-Rite 938 The printing mode is: "Plain Paper—Standard Fast" by a driver installed onto the printer with the color matching off.

Retransferability (Offset) of Ink

The retransferability of ink was used to evaluate drying properties. Retransferability of ink is a phenomenon that if ink is attached to a recording medium to form an image and remains on the surface thereof in a large amount, the ink on the surface of the recording medium attaches to and contaminates a device such as a transfer roller when the printed surface of the image contacts the device while the recording medium is being transferred in the transfer path.

As in the same manner as for the evaluation on the image density, a cylinder-form roller made of polyethylene having a diameter of 40 mm was pressed with a load of 5 N against the solid square portion having a length of 40 mm of the printed surface and rolled thereon within 5 seconds of the printing. Thereafter, the color of the portion of the recording medium to which the ink was re-transferred from the cylinder-form roller was measured by X-Rite 938 and evaluated according to the following evaluation criteria. The printing mode: "Plain Paper—Standard Fine" was selected from the driver installed onto the printer with the color matching off.

Evaluation Criteria
A: Less than 0.10
B: 0.10 to less than 0.25
C: 25 or higher

Evaluation on Curling

A "square solid chart" set to the limit of the border (margins: upper and left: 5.1 mm, lower and right: 5.2 mm) of the printing range prepared by Microsoft Word 2000 was printed on the recording medium. Thereafter, the recording medium was placed on a flat surface with the printed surface facing down within five seconds of printing. The height of the four corners of the recording medium was measured from the flat surface to calculate the average thereof.

The printing mode: "Plain Paper—Standard Fast" was selected from the driver installed onto the printer with the color matching off. Curling was measured within 10 seconds of discharging of the recording medium and evaluated according to the following criteria.

Evaluation Criteria
A: less than 20 mm
B: 20 mm to less than 40 mm
C: 40 mm or more or curled Discharging Stability A solid chart covering 5% of the area of A4 paper per color, drawn by Microsoft Word 2000, was continuously printed with a run length of 200 sheets and disturbance of ink discharging by each nozzle was evaluated after the printing according to the following criteria. The printing mode used was modified from "Plain Paper—Standard Fast" to "no color calibration" on the user setting for plain paper by the driver installed onto the printer. The evaluation was made at 22° C. to 24° C. and a humidity of from 45% RH to 55% RH.

Evaluation Criteria
A: No discharging disturbance
B: Slight discharging disturbance observed
C: Not discharged from some nozzles Intermittent Discharging Stability After left still in an environment of 34° C. to 36° C. and 10% RH to 20% RH for two hours after head cleaning, a solid chart covering 5% of the area of A4 paper per color, drawn by Microsoft Word 2000 was printed on one sheet (My Paper, manufactured by NBS RICOH CO., LTD.) and disturbance of ink discharging by each nozzle was evaluated. The printing mode used was: a modified mode in which "Plain Paper—Standard Fast" was modified to "no color calibration" from a user setting for plain paper by a driver installed onto the printer.

Evaluation Criteria
A: No discharging disturbance
B: Slight discharging disturbance observed
C: Not discharged from some nozzles Storage Stability Each ink was left still in a constant tank at 65° C. for four weeks. The viscosity change rate of the ink before and after storage at the constant tank followed by evaluation according to the following criteria.

Evaluation Criteria
A: Viscosity change rate: Greater than −5% to less than 5%
B: Viscosity change rate: Less than −5% to greater than −10% and greater than 5% to less than 10%
C: Viscosity change rate: −10% or less and 10% or greater

TABLE 5

|  | Image density | Offset | Curling 10 seconds later | Discharging stability | Intermittent discharging stability | Storage stability |
|---|---|---|---|---|---|---|
| Example 1 | 1.26 | A | A | A | A | A |
| Example 2 | 1.26 | A | A | A | A | A |
| Example 3 | 1.26 | A | A | A | A | A |
| Example 4 | 1.25 | A | A | A | A | A |
| Example 5 | 1.26 | A | A | A | A | A |
| Example 6 | 1.25 | A | A | A | A | A |
| Example 7 | 1.21 | A | A | A | A | A |
| Example 8 | 1.25 | A | A | A | A | A |
| Example 9 | 0.81 | A | A | A | A | A |
| Example 10 | 1.01 | A | A | A | A | A |
| Example 11 | 1.06 | A | A | A | A | A |
| Example 12 | 1.02 | A | A | A | A | A |
| Example 13 | 0.81 | A | A | A | A | A |
| Example 14 | 1.05 | A | A | A | A | A |
| Example 15 | 1.26 | A | A | A | A | A |
| Example 16 | 1.25 | B | B | A | A | A |
| Example 17 | 1.25 | A | A | A | B | B |
| Example 18 | 1.25 | B | A | A | A | B |
| Example 19 | 1.26 | A | B | A | B | B |
| Example 20 | 1.25 | A | B | A | B | B |
| Example 21 | 1.26 | A | A | A | A | A |
| Example 22 | 1.24 | A | A | A | A | A |
| Example 23 | 1.26 | A | A | A | A | A |
| Example 24 | 1.21 | B | B | A | A | A |
| Example 25 | 1.24 | B | A | A | A | A |
| Example 26 | 1.25 | A | A | A | A | A |
| Example 27 | 1.26 | A | A | A | A | A |
| Comparative Example 1 | 1.24 | A | A | A | C | C |
| Comparative Example 2 | 1.25 | A | A | A | C | C |
| Comparative Example 3 | 1.24 | A | A | A | C | C |
| Comparative Example 4 | 1.25 | A | A | A | C | C |
| Comparative Example 5 | 1.26 | A | A | A | C | C |
| Comparative Example 6 | 1.24 | A | A | A | C | C |
| Comparative Example 7 | 1.25 | A | A | A | C | C |
| Comparative Example 8 | 1.26 | A | A | A | C | C |
| Comparative Example 9 | 1.25 | C | B | A | A | A |
| Comparative Example 10 | 1.18 | C | A | A | C | C |
| Comparative Example 11 | 0.80 | A | A | A | C | C |
| Comparative Example 12 | 1.01 | A | A | A | C | C |
| Comparative Example 13 | 1.05 | A | A | A | C | C |

TABLE 5-continued

|  | Image density | Offset | Curling 10 seconds later | Discharging stability | Intermittent discharging stability | Storage stability |
| --- | --- | --- | --- | --- | --- | --- |
| Comparative Example 14 | 1.02 | A | A | A | C | C |
| Comparative Example 15 | 0.81 | A | A | A | C | C |
| Comparative Example 16 | 1.06 | A | A | A | C | C |
| Comparative Example 17 | 1.16 | C | A | A | C | C |
| Comparative Example 18 | 1.13 | C | A | B | C | C |
| Comparative Example 19 | 1.20 | B | C | B | C | A |

According to the present invention, inkjet ink is provided which prevents the retransfer of the ink and has excellent reliability and storage property (intermittent discharging stability) of inkjet heads after operation suspension.

Having now fully described embodiments of the present invention, it will be apparent to one of ordinary skill in the art that many changes and modifications can be made thereto without departing from the spirit and scope of embodiments of the invention as set forth herein.

What is claimed is:

1. Inkjet ink comprising:
water,
hydrosoluble organic materials; and
a colorant,
wherein the hydrosoluble organic materials account for 30% by weight to 50% by weight of the inkjet ink,
wherein the hydrosoluble organic materials comprise 3-methoxy-1-butanol and at least one of 1,3-butane diol, 3-methyl-1,3-butane diol, 3-methyl-3-hydroxymethyl oxetane, or 1,2-propane diol, in an amount of 1% by weight or more of the inkjet ink.

2. The inkjet ink according to claim 1, wherein 3-methoxy-1-butanol accounts for from 15% by weight to 40% by weight of the inkjet ink.

3. The inkjet ink according to claim 1, wherein 1,3-butane diol, 3-methyl-1,3-butane diol, 3-methyl-3-hydroxymethyl oxetane, and 1,2-propane diol, account for 5% by weight to 40% by weight of the inkjet ink.

4. An ink cartridge comprising:
an ink container to accommodate the inkjet ink of claim 1.

5. An inkjet recording device comprising:
an ink cartridge comprising an ink container to accommodate the inkjet ink of claim 1.

6. An ink printed matter comprising:
a recording medium; and
an image formed on the recording medium by the inkjet ink of claim 1.

7. The inkjet ink according to claim 1, wherein the hydrosoluble organic materials further comprise at least one of 2,2,4-trimethyl-1,3-pentane diol, 2-ethyl-2-methyl-1,3-propanediol, 3,3-dimethyl-1,2-butane diol, 2-methyl-2-propyl-1,3-propane diol, 2,4-dimethyl-2,4-pentane diol, 2,5-dimethyl-2,5-hexane diol, or 5-hexene-1,2-diol in an amount of from 0.1% by weight to 4.0% by weight of the inkjet ink.

* * * * *